United States Patent [19]
Lind et al.

[11] Patent Number: 5,203,831
[45] Date of Patent: Apr. 20, 1993

[54] TOPPING AND DUMPING VALVE FOR INFLATABLE STRUCTURES

[75] Inventors: John R. Lind, Burnsville; Robert L. Swanson, Ham Lake, both of Minn.

[73] Assignee: Survival Engineering, Inc., Burnsville, Minn.

[21] Appl. No.: 956,407

[22] Filed: Oct. 5, 1992

[51] Int. Cl.$^5$ ............................................. F16K 15/20
[52] U.S. Cl. ...................................... 137/1; 137/223; 137/230; 137/599
[58] Field of Search .................. 137/1, 223, 230, 232, 137/513.7, 599, 243.5; 251/351

[56] References Cited

U.S. PATENT DOCUMENTS

| | | | |
|---|---|---|---|
| 588,779 | 8/1897 | Reinach | 137/599 |
| 2,772,692 | 12/1956 | Russell | 137/223 |
| 2,789,577 | 4/1957 | Hosking | 137/223 |
| 2,804,085 | 8/1957 | Geambeardino et al. | 137/223 |
| 2,824,570 | 2/1958 | Silverman et al. | 137/223 |
| 3,260,276 | 7/1966 | Staiunas | 137/234.5 |
| 3,289,694 | 12/1966 | Frye | 137/513.7 X |
| 3,785,395 | 1/1974 | Andreasson | 137/223 |
| 3,983,907 | 10/1976 | Sorensen | 137/223 |
| 3,995,653 | 12/1976 | Mackal et al. | 137/223 X |
| 4,015,622 | 4/1977 | Pagani | 137/223 |
| 4,073,311 | 2/1978 | McGeachy | 137/599 X |
| 4,495,965 | 1/1985 | Ise | 137/599 |
| 4,579,141 | 4/1986 | Arff | 137/223 |
| 5,148,830 | 9/1992 | Liu | 137/513.7 |

*Primary Examiner*—John Rivell
*Attorney, Agent, or Firm*—Zarley, McKee, Thomte, Voorhees & Seas

[57] ABSTRACT

A topping and dumping valve is provided for inflating and deflating inflatable structures, such as life rafts and military assault boats. The valve includes a first cylindrical body mounted in the inflatable structure, and a second cylindrical body threadably mounted in the first body for movement between first and second positions. In the first position, air is directed through a passageway in the second body and through inflation ports in the first body so as to move a normally closed flapper seal out of sealing engagement with the inflation ports, thereby inflating the buoyancy chamber of the structure. When the second body is in the second position, deflation ports in the first body allow air from the buoyancy chamber to escape through the deflation ports and the passageway in the second body to the atmosphere. A protective cap is provided for closing the passageway in the second body when the valve is not being used during inflation and deflation of the inflatable structure.

20 Claims, 2 Drawing Sheets

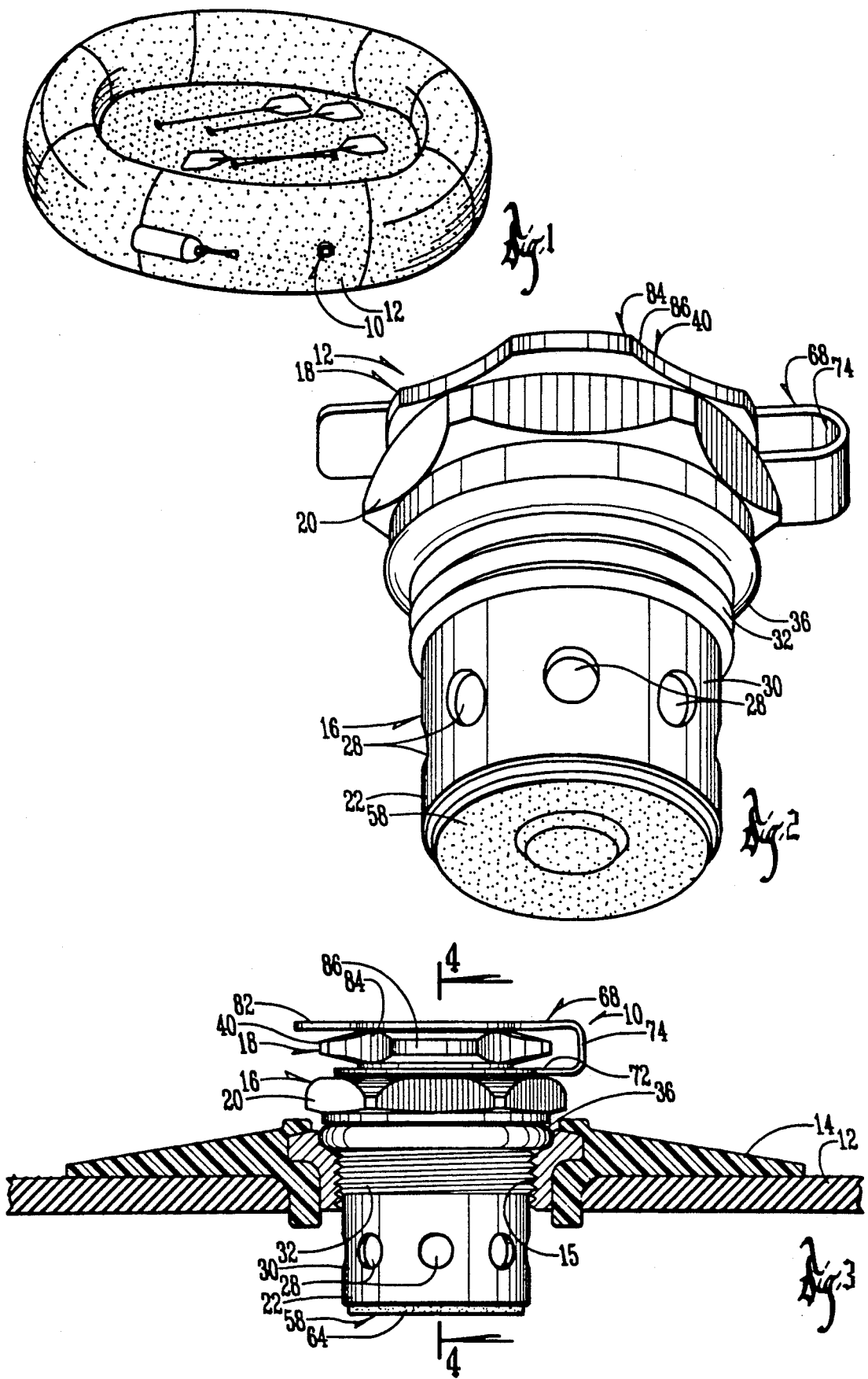

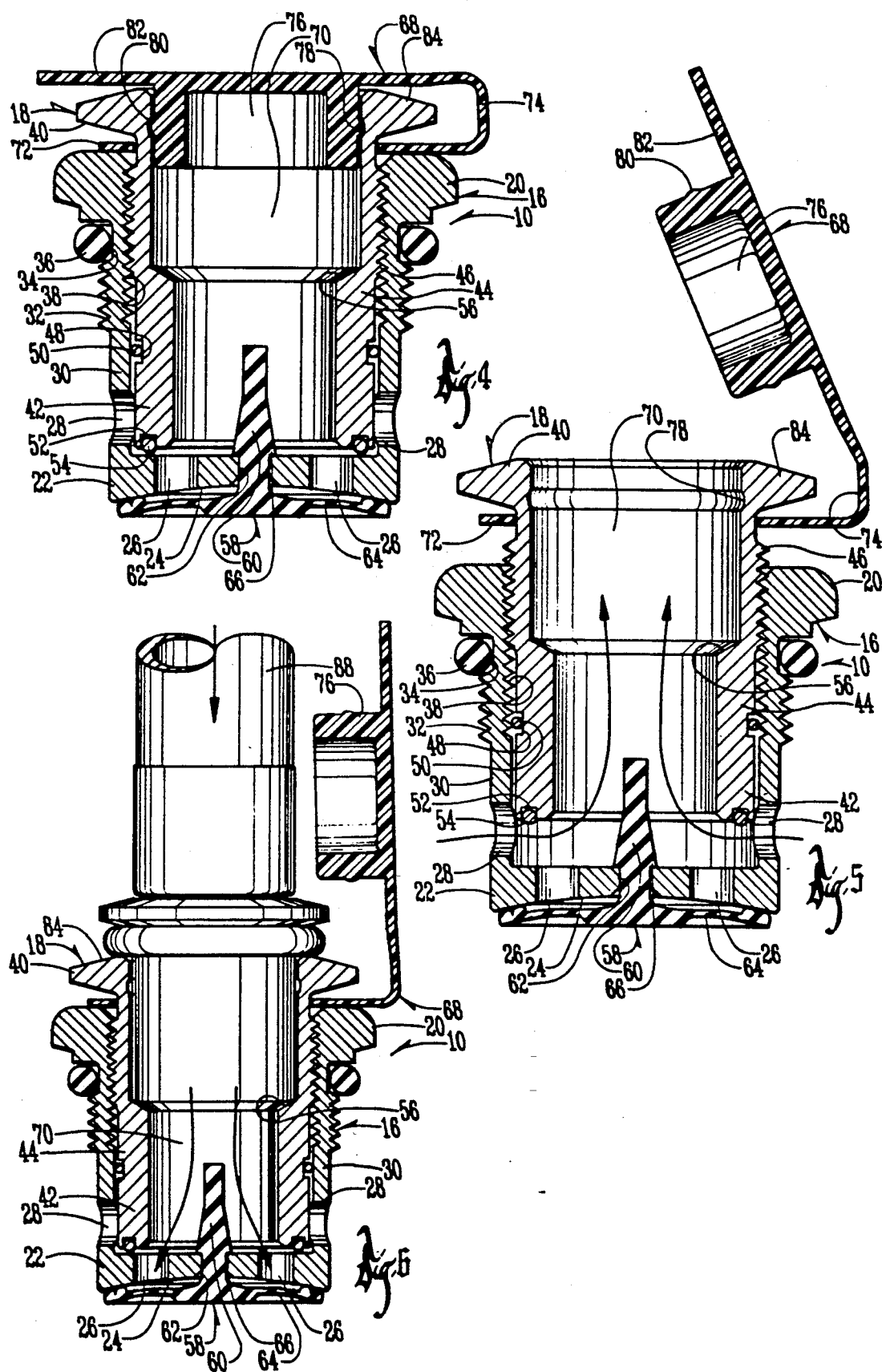

TOPPING AND DUMPING VALVE FOR INFLATABLE STRUCTURES

BACKGROUND

Inflatable structures, such as boats and rafts having one or more buoyancy chambers, are normally inflated through a valve or valves through which air or gas from a pump or compressor can be directed for filling the chambers. Alternatively, compressed gas cylinders or cartridges can be utilized to quickly inflate the chambers, such as in life rafts.

Once filled, the pressure in the buoyancy chamber can vary as the gas or air expands and contracts in response to temperature fluctuations. A topping valve is often mounted on the structure for providing the final top fill of gas such that the structure can be inflated to the desired pressure. Conventional topping valves include a first body member mounted in the inflatable structure. The body includes inflation ports and a passageway adapted to receive a nozzle or the like from a hand pump so that air can be directed through the passageway and the inflation ports and into the buoyancy chamber of the inflatable structure. A flexible seal member is normally biased into sealing engagement with the inflation ports so as to prevent air from escaping rearwardly through the ports. A cap is threadably received within the passageway of the body so as to prevent collection of dirt, sand and other foreign matter within the passageway.

In white water rafting excursions, the boat or raft is inflated, sent down the river, then deflated and transported back to the starting point for another trip down the river. After deflation, the cap is screwed in to the body to keep the passageway clean during transportation so that the raft can again be easily inflated. Similarly, in military use, inflatable assault boats and rafts are often used to carry troops to the beach, then deflated and buried in the sand while the troops move inland. The cap keeps the body passageway free from sand so that the boat can be easily inflated after it is unburied.

Some topping valves have no ability to allow deflation through the valve. Other topping valves have a spring loaded poppet which must be manually held down to deform a seal so as to allow deflation through the valve. Other topping valves allow deflation by unscrewing a valve component, but require that same component to be screwed open and then shut while the air line or hose is in position during inflation. Thus, all of these prior art topping valves have deficiencies in the inflation and/or deflation mechanism.

Accordingly, a primary objective of the present invention is the provision of an improved topping and dumping valve for inflatable structures.

Another objective of the present invention is the provision of a valve which allows for quick and easy inflation and deflation of inflatable structures. Another objective is the provision of a valve which allows a structure to be inflated without unscrewing the valve components.

Another objective is the provision of a topping and dumping valve which is moved to a first position for inflation and a second position for deflation.

A further objective of the present invention is the provision of a topping and dumping valve which is economical to manufacture and durable and safe in use.

These and other objectives will become apparent from the following description of the invention.

SUMMARY OF THE INVENTION

The topping and dumping valve of the present invention includes a first hollow cylindrical body which is adapted to be mounted on an inflatable structure. The first body has opposite and lower ends, with the upper end being open and the lower end being substantially closed. The first body has separate and distinct inflation and deflation ports in communication with the buoyancy chamber of the inflatable structure. A second hollow cylindrical body is threadably mounted within the first body for movement between first and second positions. The second body has opposite upper and lower ends, both of which are open. A flapper-type seal is provided on the first body for normally closing the inflation ports. The deflation ports are closed when the second body is in the first position and opened when the second body is moved to the second position within the first body. O-ring seals are provided for sealing the spaces between the first and second bodies.

In use, the second body is moved to a first position such that the deflation port is sealed from communication with the atmosphere. Air from a hand pump or other air supply is forced through a passageway in the second body and then through the inflation ports in the first body so as to move the flapper seal out of normal sealing engagement with the inflation port, thereby inflating the buoyancy chamber of the inflatable structure. The flapper seal prevents air from escaping through the inflation ports when the force of air therethrough is terminated. The second body is partially unscrewed so as to be moved to the second position within the first body, wherein the deflation ports provide communication from the buoyancy chamber of the structure to the atmosphere through the passageway in the second body. A removable cap may be press fit into the open upper end of the second body member so as to close the passageway therein and thereby prevent dirt, debris and other foreign matter from collecting in the passageway when the valve is not being used to inflate or deflate the structure.

BRIEF DESCRIPTION OF THE DRAWINGS

FIG. 1 is a perspective view of a life or river raft showing a topping and dumping valve of the present invention mounted therein.

FIG. 2 is a perspective view of the valve of the present invention.

FIG. 3 is a side elevation view of the valve.

FIG. 4 is a sectional view taken along lines 4—4 of FIG. 3 showing the second cylindrical body in a first position within the first cylindrical body of the valve.

FIG. 5 is a view similar to FIG. 4 showing the second body in a second position within the first body.

FIG. 6 is a view similar to FIG. 4 showing an inflation nozzle in place within the valve for inflating an inflatable structure.

DESCRIPTION OF PREFERRED EMBODIMENT

The topping and dumping valve of the present invention is generally designated in the drawings by the reference numeral 10. Valve 10 is designed for use on inflatable structures or devices, such as the raft 12 shown in FIG. 1. More particularly, raft 12 includes a flange 14 which is permanently mounted in the body of raft 12, and includes female threads for threadably receiving valve 10, as described below. Inflatable devices such as raft 12 normally have at least two buoyancy chambers for safety purposes, and accordingly, a valve 10 would be provided for each chamber.

Valve 10 includes a first cylindrical body 16 and a second cylindrical body 18. The body 16 has an upper end 20 and a lower end 22. The upper end 20 is open for receipt of second body 18 and the lower end 22 is substantially closed by a bottom wall 24. A plurality of inflation ports 26 are provided in the bottom wall 24. A plurality of expulsion or deflation ports 28 are provided in the sidewall 30 of the first body 16 adjacent the lower end 22 thereof.

Sidewall 30 includes external threads 32 which are threadably received within the threads 15 of flange 14 so as to mount the valve 10 on the raft 12. The exterior surface of the sidewall 30 includes an annular recess 34, in which is mounted a O-ring 36 which provides a seal to prevent liquids from seeping into the buoyancy chamber of the raft 12 and to prevent air from escaping from the buoyancy chamber through the flange 14. The first body 16 also has interior threads 38 on the inner surface of the sidewall 30.

The second cylindrical body 18 includes an upper end 40 and a lower end 42, both of which are open. The sidewall 44 of the second body 18 includes external threads 46 for threadably mating with the interior threads 38 of the first body member 16.

The outer surface of the sidewall 44 of the second body 18 includes an annular recess 48. An O-ring seal 50 is mounted in the recess 48 for sealing engagement between the outer surface of sidewall 44 of the second body 18 and the inner surface of sidewall 30 of the first body 16. The lower end 42 of the second body 18 also includes an annular recess 52 in which an O-ring 54 is mounted for providing a seal between the lower end of the second body 18 and the bottom wall 24 of the first body 16. The second body 18 also has a shoulder 56 formed in the inner surface of sidewall 44.

A flexible flapper-type seal 58 is mounted in the bottom wall 24 of the first body 16. More particularly, the flapper seal 58 includes a stem 60 which extends through a hole 62 in the bottom wall 24. A resilient membrane 64 is normally biased into sealing engagement with the bottom wall 24 of the first body 16 so as to seal the inflation ports 26. The flapper seal 58 is retained in position on bottom wall 24 by a shoulder 66 formed on the stem 60.

A cap 68 is provided on valve 10 to prevent dirt, sand, and other foreign material from entering the passageway 70 defined by the sidewall 44 of the second body 18. Cap 68 includes a collar 72 with a hole therein so that the collar surrounds the second body 18. A flexible integral hinge 74 extends from he collar 72 to a plug element 76. The plug element 76 is sized so as to fit snugly within passageway 70 of second body 18. A detent 78 may be provided on the plug element 76 for mating engagement with an annular recess 80 on the inner wall of sidewall 44 of the second body 18 so as to provide positive retentive engagement of the cap 76 in the second body 18. A finger grip portion 82 extends from the plug element 76 so that the plug can be easily removed from the second body 18.

Preferably, the bodies 16 and 18 are made of a plastic material, such as delrin. The flapper seal 58 and the O-ring seals 50 and 54 are preferably made of ethylene propylene rubber. O-ring 36 is preferably made of nitrile. The protective cap 68 is also preferably made of ethylene propylene rubber. A lubricant, such as Dow-Corning DC-4 is preferably used on the exterior wall of the second body 18 so that the body can move more easily between the first and second positions.

The second body 18 is adapted to move between a first position shown in FIG. 4 and a second position shown in FIG. 5. Movement of the second body between the first and second positions is accomplished by manually turning the body clockwise or counterclockwise so that it is threaded into or partially out of the first body 16. A head 84 having a plurality of scallops 86 is provided on the upper end 40 of the second body 18 so as to provide easy gripping and turning of the second body 18 relative to the first body 16.

When the second body 18 is in the first position, O-ring 54 sealingly engages the bottom wall 24 of the first body 16 and the deflation ports 28 are sealed from communication with the passageway 70 of the second body. With the second body being in the first position, raft 12 can be inflated by placing the nozzle or hose 88 of a hand pump or other air supply into the upper end of the second body 18 so as to engage the shoulder 56, with cap 68 open, as seen in FIG. 6. When the pump is activated, air is forced through the passageway 70 and the inflation ports 26 so as to lift the resilient member 64 of the flapper seal 58 out of sealing engagement with the bottom wall 24 of the first body 16. Accordingly, the buoyancy chamber of the raft 12 can be inflated. When the pump is deactivated, the resilient member 64 of flapper seal 58 automatically returns to sealing engagement with the bottom wall 24 due to the normal bias of the seal, and it is further forced into sealing engagement by the pressure within the buoyancy chamber of the raft 12.

When it is desirable to deflate the buoyancy chamber, the second body 18 is unscrewed to the second position such that the deflation ports 28 are unsealed, thereby providing communication between the buoyancy chamber and the atmosphere, via the deflation ports 28 and the passageway 70.

During both inflation and deflation, the cap 68 is in the open position with the plug element 76 removed from the upper end of the second body 18. After inflation or deflation is completed, the cap 68 is closed with the plug element sealingly engaged within the upper end of the second body, so as to prevent the passageway 70 from becoming filled with dirt, sand or foreign matter.

The invention has been shown and described above in connection with the preferred embodiment, and it is understood that many modifications, substitutions and additions may be made which are within the intended broad scope of the invention. From the foregoing, it can be seen that the present invention accomplishes at least all of the stated objectives.

We claim:

1. A valve for inflating and deflating inflatable devices, comprising:

a first hollow cylindrical body mounted on the inflatable device and having opposite upper and lower ends, the upper end being open and the lower end being substantially closed, and having spaced apart inflation and deflation ports in communication with a buoyancy chamber of the structure;

seal means for opening and closing the inflation port in the first body;

a second hollow cylindrical body having opposite upper and lower ends, both of which are open; and the second body being mounted within the first body for movement between first and second positions in the first body so as to selectively open and close the deflation port.

2. The valve of claim 1 wherein the seal means is a flexible membrane which is movable between a normally closed position for closing the inflation port and an open position for opening the inflation port.

3. The valve of claim 1 wherein the first and second bodies include threadably mating female and male threads for mounting the second body within the first body.

4. The valve of claim 1 further comprising second seal means for providing an air-tight seal between the first and second bodies.

5. The valve of claim 4 wherein the second seal means includes an O-ring mounted on one of the first and second bodies for engagement with the other body between the inflation and deflation ports.

6. The valve of claim 4 wherein the second seal means includes an O-ring mounted on one of the first and second bodies for engagement with the other body between the expulsion port and the open upper end of the first body.

7. The valve of claim 1 further comprising cap means for selectively closing the open upper end of the second body.

8. A topping and dumping valve for inflatable devices, comprising:
   a first tubular body mounted on the inflatable device and having a sidewall with interior threads and exterior threads, at least one inflation port, and at least one expulsion port;
   a second tubular body having opposite upper and lower ends, and a sidewall with external threads such that the second body is threadably coupled to the first body;
   seal means mounted on the first body and movable between a closed position sealing the inflation port of the first body and an open position spaced from the inflation port;
   the second body being movable between a closed position sealing the expulsion port and an open position exposing the expulsion port; and
   the second body having a passageway therethrough providing communication between a source of air and the inflation port of the first body.

9. The valve of claim 8 wherein the passageway of the second body provides communication between the expulsion port of the first body and the atmosphere.

10. The valve of claim 8 wherein the sidewall of the first body has opposite inner and outer surfaces, the second body includes sealing means for sealingly engaging the inner surface of the sidewall of the first body.

11. The valve of claim 8 further comprising cap means in removable covering relation over the upper end of the second body so as to prevent foreign material from entering the passageway.

12. The valve of claim 8 wherein the first body member includes a lower end wall, the inflation port residing in the end wall and the expulsion port residing in the sidewall.

13. The valve of claim 12 wherein the second body has a lower end with a seal member therein for sealingly engaging the end wall of the first body when the second body is in the closed position.

14. A method of inflating and deflating an inflatable device using a valve comprising a first body extending into the inflatable device and having inflation and deflation ports therein providing selective communication with a buoyancy chamber of the device, a second body movably mounted in the first body, and seal means normally biased for sealing the inflation port, the method comprising:
   moving the second body to a first position in the first body wherein the deflation port is sealed from communication with the atmosphere,
   forcing gas from a gas source through a passageway in the second body and then through the inflation port to move the seal means out of normal sealing engagement with the inflation port so as to inflate the device, and
   terminating the force of gas through the second body and inflation port such that the seal means returns to sealing engagement with the inflation ports thereby preventing outward flow of air through the inflation port.

15. The method of claim 14 further comprising moving the second body to a second position in the first body wherein the deflation port provides communication from the buoyancy chamber to the atmosphere through the passageway in the second body.

16. A valve for inflating and deflating an inflatable structure, comprising:
   a first body extending into the inflatable structure and having inflation and deflation ports therein providing selective communication between the interior of the structure and the atmosphere; and
   a second body movably mounted within the first body and having a passageway therein through which gas flows for inflating and deflating the structure.

17. The valve of claim 16 further comprising seal means for selectively sealing the inflation port from communication with the interior of the structure.

18. The valve of claim 17 wherein the seal means is normally biased to a sealing position and is moved to an unsealed position by gas passing inwardly through the inflation port into the interior of the structure.

19. The valve of claim 16 comprising seal means for selectively sealing the expulsion port from communication with the atmosphere.

20. The valve of claim 16 wherein the first and second bodies are threadably coupled together.

* * * * *